United States Patent
Guo et al.

(10) Patent No.: US 11,637,273 B2
(45) Date of Patent: Apr. 25, 2023

(54) PREPARATION METHOD OF SILICON-BASED COMPOSITE NEGATIVE ELECTRODE MATERIAL FOR LITHIUM BATTERY

(71) Applicant: BEIJING IAMETAL NEW ENERGY TECHNOLOGY CO., LTD, Beijing (CN)

(72) Inventors: Yuguo Guo, Beijing (CN); Linbo Huang, Beijing (CN); Quan Xu, Beijing (CN); Yaxia Yin, Beijing (CN); Fengshu Yue, Beijing (CN); Jun Yao, Beijing (CN); Anguang Zhao, Beijing (CN)

(73) Assignee: BEIJING IAMETAL NEW ENERGY TECHNOLOGY CO., LTD, Beijing (CN)

(*) Notice: Subject to any disclaimer, the term of this patent is extended or adjusted under 35 U.S.C. 154(b) by 0 days.

(21) Appl. No.: 17/753,303

(22) PCT Filed: Mar. 27, 2020

(86) PCT No.: PCT/CN2020/079406
§ 371 (c)(1),
(2) Date: Feb. 25, 2022

(87) PCT Pub. No.: WO2021/056981
PCT Pub. Date: Apr. 1, 2021

(65) Prior Publication Data
US 2022/0352492 A1     Nov. 3, 2022

(30) Foreign Application Priority Data
Sep. 24, 2019 (CN) .......................... 201910907245.5

(51) Int. Cl.
| H01M 4/04 | (2006.01) |
| H01M 4/485 | (2010.01) |
| H01M 4/62 | (2006.01) |
| C01B 33/20 | (2006.01) |
| H01M 4/02 | (2006.01) |

(52) U.S. Cl.
CPC .......... *H01M 4/0471* (2013.01); *C01B 33/20* (2013.01); *H01M 4/485* (2013.01); *H01M 4/625* (2013.01); *C01P 2002/74* (2013.01); *C01P 2004/03* (2013.01); *C01P 2006/40* (2013.01); *H01M 2004/021* (2013.01); *H01M 2004/027* (2013.01)

(58) Field of Classification Search
None
See application file for complete search history.

(56) References Cited

FOREIGN PATENT DOCUMENTS

| CN | 103855364 A | 6/2014 |
| CN | 102259858 B | 1/2015 |
| CN | 105103346 A | 11/2015 |
| CN | 105849953 A | 8/2016 |
| CN | 106356508 A | 1/2017 |
| CN | 106537659 A | 3/2017 |
| CN | 107195871 A | 9/2017 |
| CN | 108448096 A | 8/2018 |
| CN | 108963194 A | 12/2018 |
| CN | 109768246 A | 5/2019 |
| CN | 110066987 A | 7/2019 |
| CN | 110615423 A | 12/2019 |
| KR | 20140147448 A | 12/2014 |

*Primary Examiner* — Tanisha Diggs
(74) *Attorney, Agent, or Firm* — Novick, Kim & Lee, PLLC; Allen Xue (57) ABSTRACT

A preparation method of silicon-based composite negative electrode material for a lithium battery includes the following steps: forming steam from a raw material A containing Si and a reducing substance raw material B capable of reacting to generate a silicate under a vacuum heating condition, condensing and depositing in a deposition system after a reaction, and then carrying out carbon coating to obtain the silicon-based composite material. A certain amount of alloy is added into the raw material B, so that a proportion of a crystal region in the silicon-based composite material can be reduced, and the initial coulombic efficiency and the cycling stability of the negative electrode material are further improved.

7 Claims, 9 Drawing Sheets

FIG. 9

PREPARATION METHOD OF SILICON-BASED COMPOSITE NEGATIVE ELECTRODE MATERIAL FOR LITHIUM BATTERY

FIELD

The present invention belongs to the technical field of batteries, and particularly relates to a preparation method of silicon-based composite negative electrode material for a lithium battery.

BACKGROUND

With the rapid development of the fields of portable electronic products, electric vehicles, energy storage power stations and so on, people have higher and higher requirements on performance indexes such as energy density, power density, cycle life and the like of energy storage equipment. Lithium ion batteries have been widely used in consumer electronics, electric tools, medical electronics and other fields because of their high specific capacity, high energy density and power density, no self-discharge, and environmental protection. However, at present, negative electrode materials in commercial lithium ion batteries are mainly low-capacity graphite materials, and their theoretical capacity is only 372 mAh/g, which limits the application of lithium ion batteries in the fields of electric vehicles and large-scale energy storage. Therefore, the development of high-capacity negative electrode material for the lithium ion battery is a key for solving the energy problem in the current society.

In terms of a negative electrode material for a novel lithium ion battery, a silicon-based negative electrode material is a very ideal negative electrode material for a next-generation lithium ion battery due to ultrahigh lithium storage capacity (4200 mAh/g) and a relatively low voltage platform, and is widely concerned. However, the silicon-based material has many problems in a lithium ion delithiation and lithiation process during the progress of charging and discharging: 1. Huge volume change: the volume of the silicon material can expand to 300% of the original volume in the lithium ion intercalation process. The volume is sharply shrunk when the lithium ions are extracted, so that active material particles are crushed, an electrode plate falls off and is pulverized, and the cycle life is sharply reduced. 2. Large irreversible capacity and low coulombic efficiency: the initial coulombic efficiency of the silicon-based material is relatively low, and particularly a silicon monoxide material can generate a large amount of irreversible capacity in the initial charging and discharging process because of containing an inactive component capable of consuming lithium ions, so that the positive electrode is difficult to match, the total battery efficiency is low and the cycle life is short. And 3. Extremely low conductivity: silicon itself is a semiconductor and is poor in conductivity, so that rapid transmission of electrons is not facilitated, and normal exertion of the capacity of the silicon-based negative electrode material is influenced. In view of the above problem of volume expansion, the patent CN108448096A discloses a high-capacity core-shell type amorphous carbon-based composite material, and the present invention adopts polyhedral oligomeric silsesquioxane as a precursor of a carbon-silicon coating layer, followed by further coating with conductive carbon or thermally pyrolyzed carbon to prepare the core-shell type amorphous carbon-based composite material. The core-shell composite material effectively relieves volume expansion in the cycle process and has excellent cycle performance. However, the core-shell structure cannot keep the existing morphology in the electrode plate preparation process, a new interface is exposed through electrode plate rolling, SEI continuously grows, and battery performance degradation is caused.

The patent CN201110149645 discloses a method for preparing porous silicon through magnesiothermic reduction, the method uses a large amount of magnesium to reduce silicon monoxide into silicon. Thus, the problem that oxygen in silicon monoxide consumes lithium ions is solved. However, the original silicon-oxygen structure of silicon monoxide is damaged, volume expansion cannot be effectively buffered, and the cycle performance of a battery is poor.

Many methods for solving the expansion rate problem of the silicon-based negative electrode material are reported in the prior art. A part of SiOx in the silicon-based material is converted into a silicate form as a buffer point, and the silicate as an inactive substance does not expand in the charging and discharging process of the battery, so that the expansion rate of the silicon-based negative electrode material is reduced. CN106356508A discloses a silicon-based negative electrode material, including silicon and silicon oxide (SiOx, $0<x\leq2$). SiO steam and reducing substance steam are subjected to a reaction in a gas phase form, and condensed to obtain the compound as the silicon-based negative electrode material. CN106537659A discloses a negative electrode active material, wherein silicon oxide powder and a metal M are heated at high temperature to form silicate, and the silicate is distributed in a silicon-based composite material to play a role in buffering expansion. CN105849953A discloses a nano silicon/graphene composite negative electrode material, Silicon atoms and oxygen atoms are uniformly distributed in the silicon monoxide. Due to the problem of treatment temperature, the silicon atoms can be agglomerated together to form silicon crystal regions. The more crystal regions, the more serious the silicon agglomeration. In addition, the volume expansion of silicon in the crystalline region is significantly larger than that of uniformly dispersed silicon monoxide during charging and discharging, resulting in a battery with lower cycle stability than a battery using uniformly dispersed silicon monoxide. Therefore, the material needs to be made into an amorphous form as much as possible. Therefore, developing a silicon-based composite material capable of reducing a proportion of a crystal region in a negative electrode material in a preparation process has extremely important and practical significance.

SUMMARY

The present invention aims to solve the problems of low initial-cycle Coulombic efficiency and poor cycle performance of the existing silicon-based composite material, and provides a preparation method of a silicon-based composite negative electrode material for a lithium battery to improve the cycle life and the energy density of the current negative electrode material for a lithium ion battery. The silicon-based composite negative electrode material for the lithium ion battery is prepared by a method of in situ doping alkali metal, alkaline earth metal elements, or third main group elements. Compared with other preparation methods, non-active components (mainly oxygen in silicon monoxide) capable of being bound to lithium ions in the silicon-based composite material obtained by the method of the present invention are consumed in advance by doped reducing element components. And the product silicate can buffer volume expansion generated in the lithium intercalation process. The inventor unexpectedly finds that a proportion of a crystal region in the obtained silicon-based composite material is small by replacing a metal elementary substance or a metal oxide/peroxide with a part of alloy, so that the cycle life and the energy density of the negative electrode material are improved, and the initial Coulombic efficiency and the cycle performance of the silicon monoxide material are greatly improved; Therefore, the method has a very wide application prospect.

In order to achieve the above purpose, the present invention provides a preparation method of silicon-based composite negative electrode material for a lithium battery, including the following steps:

(1) Drying a raw material A capable of generating SiOx ($0<x\leq2$) steam at a high temperature and a raw material B capable of reacting with the SiOx steam to generate a silicate in a non-oxidizing atmosphere;

(2) Heating the dried raw material A and the dried raw material B under vacuum to be changed into steam, uniformly mixing the steam generated by the raw material A and the raw material B, and condensing and depositing; and (3) Crushing the deposited material to a proper particle size, and then carrying out carbon coating to obtain the silicon-based composite negative electrode material.

Wherein the raw material A in the step (1) is one or a combination of two or more of silicon powder, silicon monoxide powder and silicon dioxide powder; the raw material B is selected from at least one of alkali metal, alkaline earth metal, a third main group elementary substance and oxides and alloys thereof, provided that the alloys account for 20 wt % or above of the raw material B.

Preferably, the high-temperature treatment in the step (2) includes firstly heating to 1000-1600° C., and performing heat preservation for 10-16 h; and then gradually reducing the temperature to 900-1200° C., and performing heat preservation for 6-10 h.

The alkali metal, the alkaline earth metal and the third main group elementary substance are selected from lithium, sodium, magnesium, calcium and aluminum; oxides/peroxides of the elementary substances are selected from at least one of lithium oxide, lithium peroxide, sodium oxide, sodium peroxide, magnesium oxide, magnesium peroxide, calcium oxide, calcium peroxide, potassium oxide, potassium peroxide and aluminum oxide, and the alloys of the elementary substances are selected from magnesium-lithium alloy, magnesium-sodium alloy, magnesium-calcium alloy, magnesium-aluminum alloy and magnesium-manganese alloy.

As one preferred technical solution of the present invention, the alloys account for 30 wt % or above of the raw material B, and more preferably, the alloys account for 50 wt % or above of the raw material B.

The uniform mixing in the step (1) can be performed by ball-milling a liquid phase and mixing, followed by spray drying treatment, and also can be performed through solid-phase physical mixing through a high-speed mixer, a VC mixer and the like; the non-oxidizing atmosphere includes one or a combination of more of nitrogen, argon, helium, neon and krypton; the drying is preferably vacuuming drying, at 30-100° C. for 2-8 h.

In the step (2), the vacuum degree of a vacuum furnace is 1-100 Pa, and the condensing and depositing is performed at 100-200° C.

Further preferably, the vacuum heating in the step (2) is realized through a vacuum furnace with a deposition system; the vacuum furnace with the deposition system is provided with one or two or more heating cavities.

When the vacuum furnace is provided with one heating cavity, the raw material A and the raw material B are heated in the heating cavity to generate steam for a reaction; when the vacuum furnace is provided with two or more heating cavities, the raw material A and the raw material B are placed in different heating cavities respectively.

Preferably, the heating temperature of the heating cavity in which the raw material A is placed is 1200-1600° C.; the heating temperature of the heating cavity in which the raw material B is placed is 1000-1200° C.

The diameter of a gas path through which gas of the heating cavity enters the deposition system is adjustable, preferably, a flow rate of the gas entering the deposition system is a volume flow ratio of the steam of the raw material A to the steam of the raw material B, which is 100:(1-20), more preferably 100:(5-15). The steam of the raw material A and the steam of the raw material B are controlled to be within the above numerical range, more inactive components in silicon monoxide can be consumed, the initial coulombic efficiency of the material is improved. Meanwhile, the high capacity of the silicon monoxide material is guaranteed, if the amount of the steam is lower than the numerical range, the effect of improving the initial coulombic efficiency is not ideal. And if the amount of the steam is higher than the numerical range, the introduced inactive components are excessive, so that the specific capacity of the composite material is seriously reduced.

The appropriate particle size in the step (3) means that the material is crushed until the median particle size is 1-20 µm, preferably 2-10 µm.

The carbon coating is the liquid-phase coating, solid-phase coating, or chemical vapor deposition coating, and an amorphous carbon coating layer is formed on the silicon-based surface. A carbon material accounts for 5-10 wt % of the silicon-based composite material.

Equipment used for the crushing in the step (3) includes one or a combination of more of a double roll crusher, a jaw crusher, an airflow crusher, a mechanical crusher, a ball mill and a sand mill, preferably one or a combination of more of the double roll crusher, the jaw crusher, the airflow crusher and the ball mill; the appropriate particle size means that the material is crushed until a median particle size is 1-20 µm, preferably 2-10 µm.

The carbon coating is the liquid-phase coating, solid-phase coating or chemical vapor deposition coating; equipment used for the liquid-phase coating is a ball mill or a sand mill; a coating agent is one or more of coal pitch, petroleum pitch, needle coke or petroleum coke; the liquid phase is uniformly mixed, the solvent is removed by adopting a spray drying or vacuum drying method, and sintering at high temperature is performed; during the liquid-phase coating, the sintering is performed at 400-800° C., preferably 500-700° C. for 1-3 h, preferably 1.5-2.5 h; equipment used for solid-phase coating is a solid-phase coating machine; a coating agent is one or more of coal pitch, petroleum pitch, needle coke or petroleum coke, and the solid-phase coating is performed at 400-800° C., preferably 500-700° C. for 1-3 h, more preferably 1.5-2.5 h; a gas source of the chemical vapor deposition method is one or two combination of acetylene, methane, propane, butane, benzene and methylbenzene; the chemical vapor deposition coating is performed at 600-1100° C., preferably 700-1000° C. for 1-6 h, more preferably 2-5 h.

Preferably, a coating layer obtained by the carbon coating has a thickness of 1-30 nm, more preferably, 5-20 nm.

The present invention also provides a silicon-based composite negative electrode material for a lithium battery prepared by the above preparation method.

Compared with the prior art, the preparation method of the silicon-based composite negative electrode material provided by the present invention has the advantages that:

1. Inactive components capable of consuming lithium ions in a composite structure containing silicon oxides and silicate are consumed in advance by doped alkali metal elements, alkaline earth metal elements and third main group elements, so that the initial coulombic efficiency of the composite material is effectively improved; a product silicate obtained by reacting the alkali metal elements, the alkaline earth metal elements and the third main group elements with the inactive components can buffer volume expansion generated in a lithium intercalation process, so that the cycle performance of the composite material is effectively improved. And the uniform carbon coating on the surface is also beneficial to improving the conductivity of the material and improving the rate capability of the composite material.

2. The inventor unexpectedly finds that a certain amount of alloys of the alkali metal elementary substance, the alkaline earth metal elementary substance and the third main group elementary substance, especially magnesium-containing alloy, is added into a reducing substance of the raw material B capable of reacting with SiOx to generate a silicate, so that the proportion of the crystal region in the silicon-based composite material obtained by condensation and deposition can be effectively reduced. Therefore, the initial-cycle Coulombic efficiency and the cycle performance of the silicon monoxide material are greatly improved.

3. According to the preparation method, various process conditions for preparation are optimized and screened, particularly, vacuum furnace heating treatment is divided into heat preservation heat treatment at different temperatures in a heating stage and a cooling stage, and in preferred embodiments, the raw material A and the raw material B are placed in different heating cavities to be heated respectively; and the flow ratio of steam generated by the raw material A and the raw material B in the deposition area is regulated and controlled, so that the electrochemical performance of obtained silicon-based composite material is further improved when used as the negative electrode material for the lithium ion battery.

4. In addition, the preparation method provided by the present invention also has the advantages of simple method, cheap and easily available raw materials, suitability for large-scale production, high practical degree and the like.

DETAILED DESCRIPTION OF THE EMBODIMENTS

The present invention is further explained in combination with specific embodiments, but the present invention is not limited to the following embodiments.

The experimental methods in the following embodiments are conventional methods unless otherwise specified; the reagents and materials can be commercially obtained unless otherwise specified.

Embodiment 1

(1) 3 kg of Si powder and 6 kg of $SiO_2$ powder were added into a high-speed mixer, and stirred and mixed for 30 min at a rate of 1000 r/min under the conditions of inert atmosphere protection and circulating water cooling to obtain a uniformly mixed raw material A, and then heat preservation was performed on the raw material A for 2 h at 50° C. under the protection of argon to fully remove moisture; meanwhile, 0.5 kg of metal magnesium powder and 0.5 kg of magnesium-aluminum alloy (wherein the magnesium content is 36.2 wt %) were subjected to heat preservation for 2 h at 50° C. under the protection of argon to fully remove moisture, so as to obtain a raw material B.

(2) the dried raw material A was added into a heating cavity 1 of a vacuum furnace with a condensation collection system, vacuumizing was performed to 1 Pa or below, heating was started to be performed, heat preservation was performed for 20 h after heating to 1300° C., cooling was performed at a cooling rate of 50° C./h to 1100° C., and heat preservation was performed for 10 h; and meanwhile, the dried raw material B was added into a heating cavity 2, vacuumizing was performed to 1 Pa or below, heating was started to be performed, heat preservation was performed for 20 h after heating to 1000° C., cooling was performed at a cooling rate of 50° C./h to 900° C., and heat preservation was performed for 10 h. the diameter of a gas path through which gas of the heating cavity 1 and the heating cavity 2 entered the deposition system was regulated and controlled, so that the volume flow ratio of the raw material A steam to the raw material B steam entering the deposition system was 100:13, meanwhile, the temperature of the deposition area was controlled to be about 600° C., and natural cooling was performed to room temperature to obtain a blocky deposited material.

(3) the obtained deposited material was crushed into particles with a median particle size of about 5 μm through airflow crushing, the particles were added into a CVD (Chemical Vapor Deposition) furnace for carbon coating treatment, acetylene gas was introduced at a mass flow rate of 600 sccm, deposition was performed at 750° C. for 3 h, the coated material was heated to 900° C. at a heating rate of 5° C./min under the condition of nitrogen protection, heat preservation was performed for 1 h, and natural cooling was performed to room temperature to obtain the silicon-based composite negative electrode material in which SiOx and the silicate were uniformly distributed, and of which the outer layer was coated with carbon, wherein the carbon coating layer had a thickness of 10 nm, and the carbon material accounted for 5.5 wt % of the silicon-based composite material.

Embodiment 2

The operation was carried out according to the same method as that in Embodiment 1, and the difference was that the raw material B in the step (1) was 0.6 kg of metal magnesium powder and 0.4 kg of magnesium-aluminum alloy.

Embodiment 3

The operation was carried out according to the same method as that in Embodiment 1, and the difference was that the raw material B in the step (1) was 0.8 kg of metal magnesium powder and 0.2 kg of magnesium-aluminum alloy.

Embodiment 4

The operation was carried out according to the same method as that in Embodiment 1, and the difference was that the raw material B in the step (1) was 0.3 kg of metal magnesium powder and 0.7 kg of magnesium-aluminum alloy.

Embodiment 5

The operation was carried out according to the same method as that in Embodiment 1, and the difference was that in the step (2), the dried raw materials A and B were added into a heating cavity of a vacuum furnace with a condensation collection system to be heated to 1300° C., heat preservation was performed for 20 h, then the temperature was reduced to 1100° C. at a cooling rate of 50° C./h, and heat preservation was performed for 10 h.

Embodiment 6

The operation was carried out according to the same method as that in Embodiment 1, and the difference was that in the step 2, the volume flow ratio of the raw material A steam to the raw material B steam entering the deposition system was 100:8.

Embodiment 7

The operation was carried out according to the same method as that in Embodiment 1, and the difference was that in the step (2), the magnesium-aluminum alloy was replaced with magnesium-lithium alloy.

Comparative Example 1

The operation was carried out according to the same method as that in Embodiment 1, and the difference was that in the step (1), the raw material B was 1 kg of magnesium powder.

Comparative Example 2

The operation was carried out according to the same method as in Embodiment 1, and the difference was that in the step (1), the raw material B was a mixture of 0.681 kg of magnesium powder and 0.319 kg of aluminum powder.

Application Example

1. Characterization of Negative Electrode Material

Figure 1:
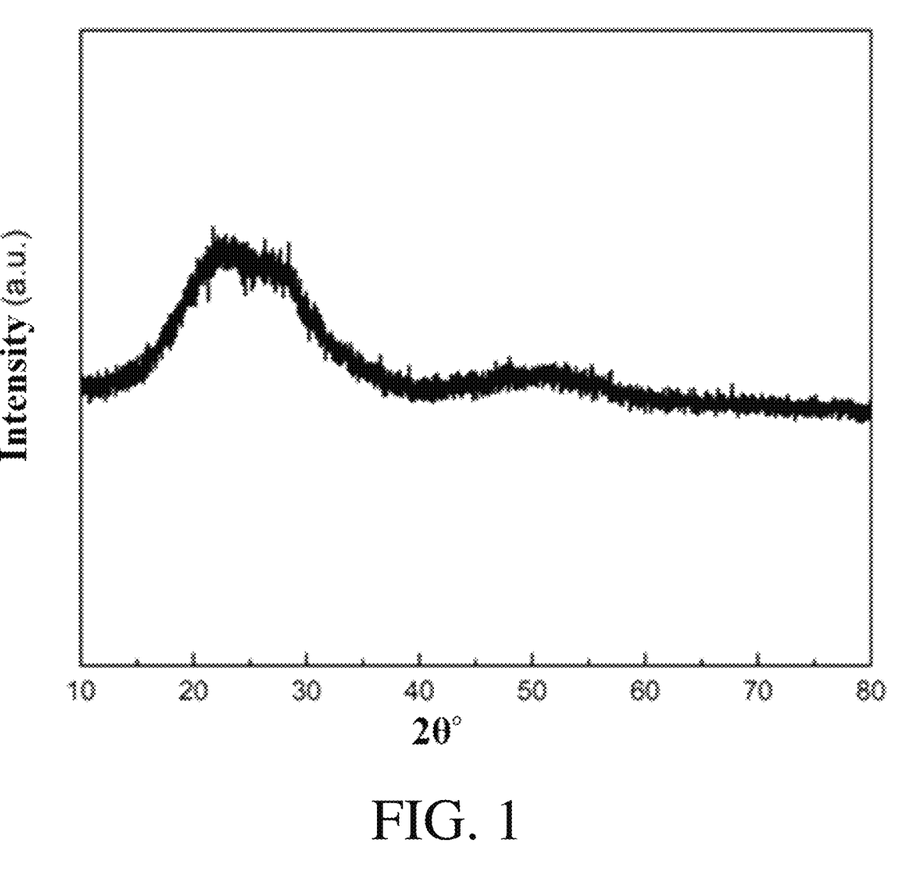
FIG. 1 is an X-ray diffraction pattern of a silicon-based composite negative electrode material prepared in Embodiment 1.
Figure 2:
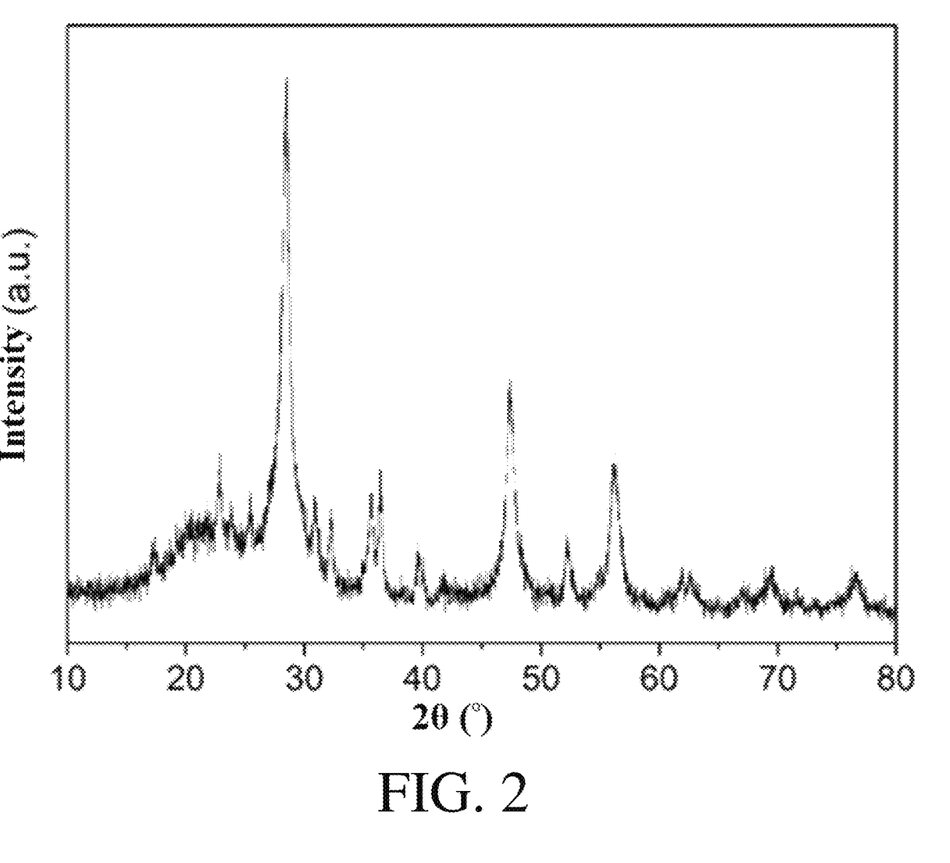
FIG. 2 is an X-ray diffraction pattern of a silicon-based composite negative electrode material prepared in Comparative example 1.
Figure 3:
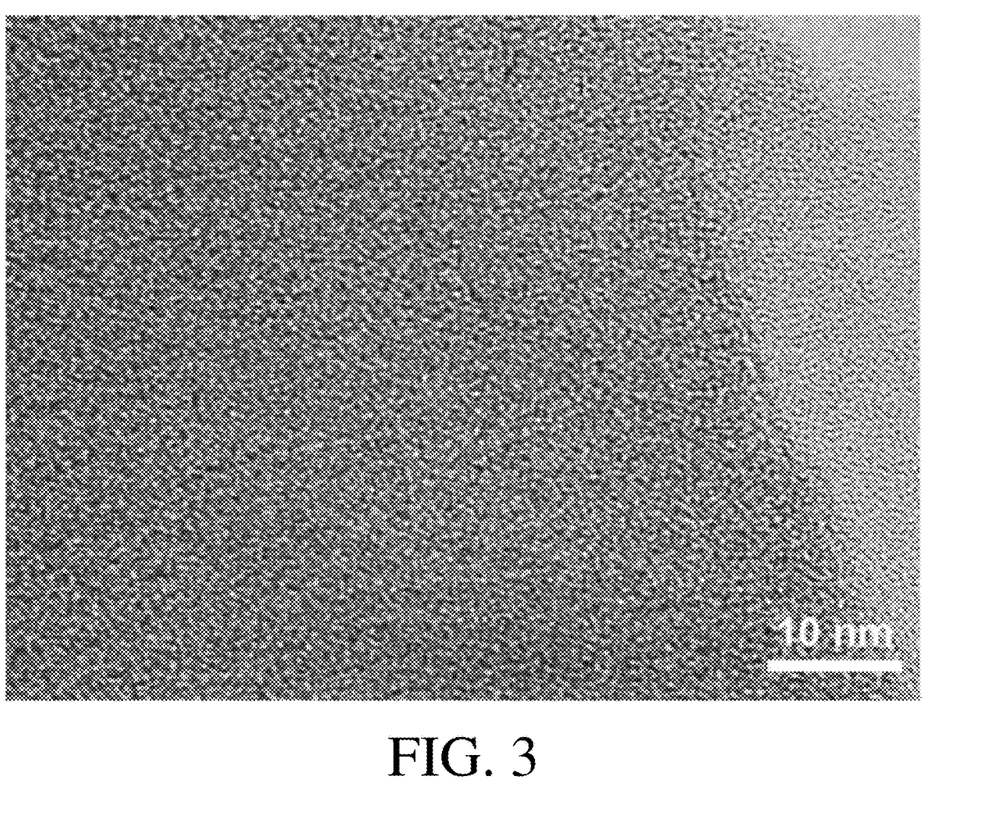
FIG. 3 is a transmission electron microscope image of the silicon-based composite negative electrode material prepared in Embodiment 1.
Figure 4:
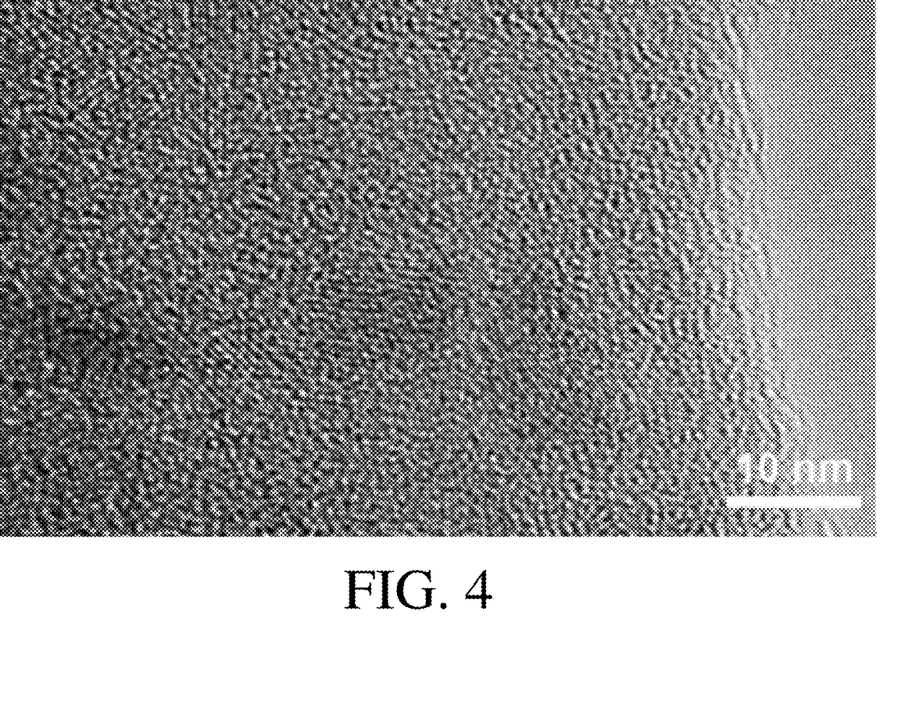
FIG. 4 is a transmission electron microscope image of the silicon-based composite negative electrode material prepared in Comparative example 1.

The X-ray diffraction peak of the composite material was analyzed by using an X-ray diffraction analyzer (XRD, Rigaku D/max 2500, Cu Kα), FIG. 1 is an XRD pattern of the silicon-based composite material prepared in Embodiment 1, FIG. 2 is an XRD pattern of the silicon-based composite material prepared in Comparative example 2, and it can be seen that there was no obvious diffraction peak and only an amorphous bump in FIG. 1, which proved a amorphous state of the material; there were obvious diffraction peaks of silicon and silicate in FIG. 2, the diffraction peaks at 28.4o, 47.3o and 56.1o correspond to crystal faces (111), (220) and (311) of silicon, and the diffraction peak at 31.0o corresponds to the diffraction peak of the silicate. The existence of the diffraction peaks showed that an obvious crystal region was formed in the material. In addition, FIG. 3 and FIG. 4 were transmission electron microscope pictures of the silicon-based composite material in Embodiment 1 and Comparative example 2 respectively. It can be seen from FIG. 3 that the silicon-based composite material prepared in Embodiment 1 did not have an obvious crystal region, which indicated that silicon monoxide in the whole material was in an amorphous state; many lattice fringes can be seen in a dark place in FIG. 4, the lattice fringe area corresponded to crystalline silicon in the place, the proportion of the crystal region was large, the volume expansion rate of the crystalline silicon was far larger than that of amorphous silicon monoxide, so that the material with a crystal structure was easier to crack in the charging and discharging process, the capacity of the material was rapidly attenuated, and the cycle performance was poor.

Figure 5:
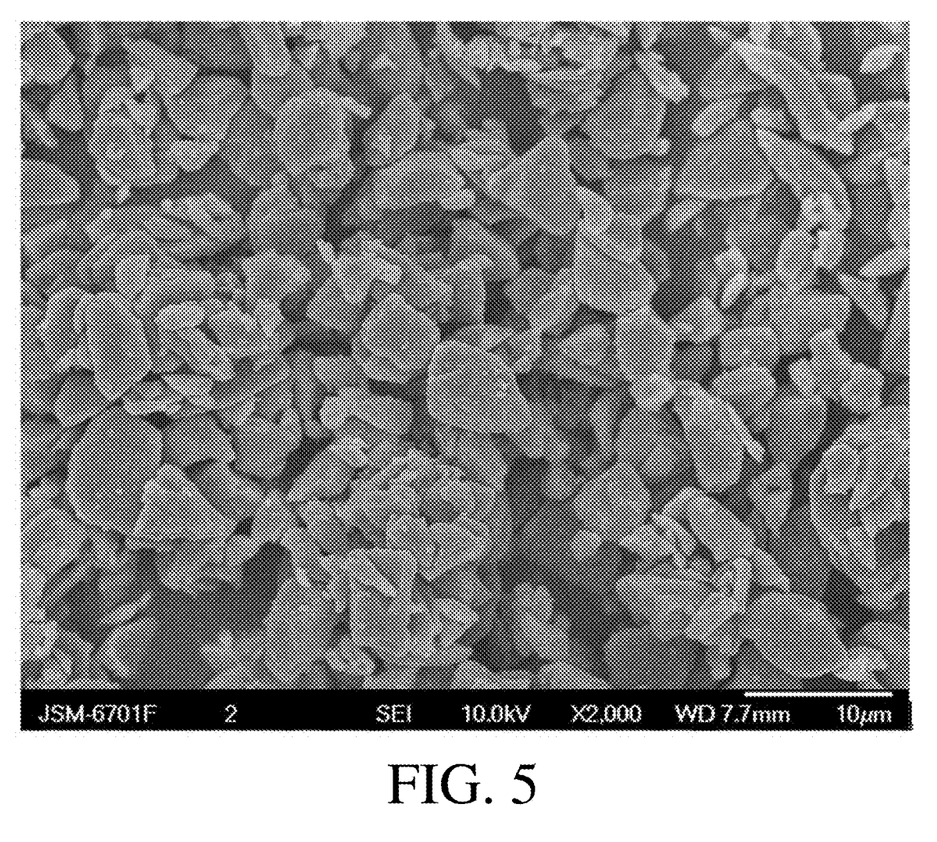
FIG. 5 is a scanning electron microscope image of the silicon-based composite negative electrode material prepared in Embodiment 1 of the present disclosure.

The morphology of the composite material was analyzed by using a scanning electron microscope (SEM, a Japanese electron scanning electron microscope JEOL-6701F), FIG. 5 is a scanning electron microscope picture of the silicon-based composite negative electrode material prepared in Embodiment 1, the composite material was blocky, the surface was compact, the particle size was uniform, and the particle size range was 1-8 μm. The particle size of the composite material was measured by using a Malvern laser particle size analyzer (Malvern, Mastersizer 3000), wherein the median particle size was 4.8 μm.

2. Performance Test of Silicon-Based Composite Material as Negative Electrode Material for Lithium Battery The electrochemical performance of the silicon-based composite negative electrode materials prepared in Embodiments and Comparative examples of the present invention was tested according to the following method: the prepared silicon-based composite negative electrode material, carbon black and a composite binder of carboxymethyl cellulose (CMC) and styrene butadiene rubber (SBR) were mixed according to a mass ratio of 80:10:10 to prepare slurry (wherein the mass ratio of CMC to SBR is 1:1); a copper foil current collector was uniformly coated with the slurry, and vacuum drying was performed for 12 h to prepare a working electrode; a lithium sheet was used as a counter electrode, a glass fiber membrane (purchased from the British Whatman company) was used as a separator, 1 mol/L LiPF6 (a solvent was a mixed solution of ethylene carbonate and dimethyl carbonate in a volume ratio of 1:1) was used as an electrolyte, VC with a volume fraction of 1% and FEC with a volume fraction of 5% were added into the electrolyte, and a button battery was assembled in a German Braun inert gas glove box in an argon atmosphere.

The charge and discharge test was performed on the assembled battery on a LAND charge and discharge tester.

Figure 6:
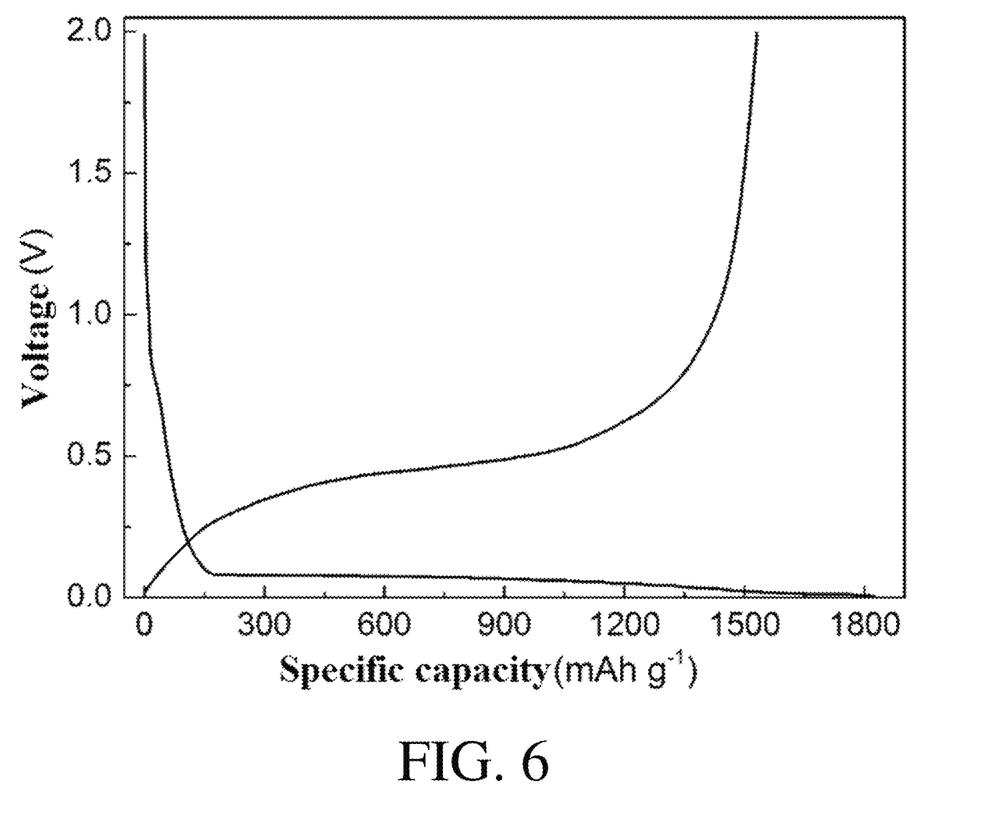
FIG. 6 is a charge-discharge curve under 0.2 C when the silicon-based composite negative electrode material prepared in Embodiment 1 is used as a negative electrode of a lithium ion battery.
Figure 7:
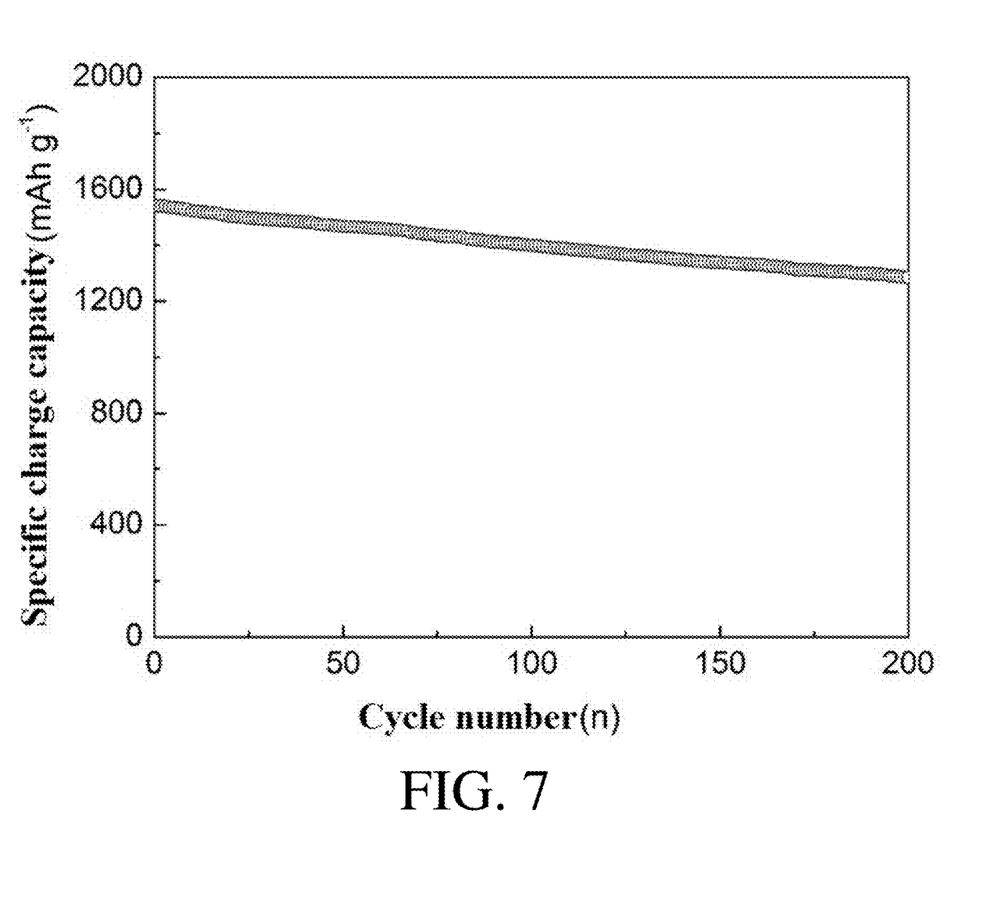
FIG. 7 is a cycle performance curve of the silicon-based composite negative electrode material prepared in Embodiment 1 under 0.2 C when the silicon-based composite negative electrode material is used as a negative electrode of a lithium ion battery.
Figure 8:
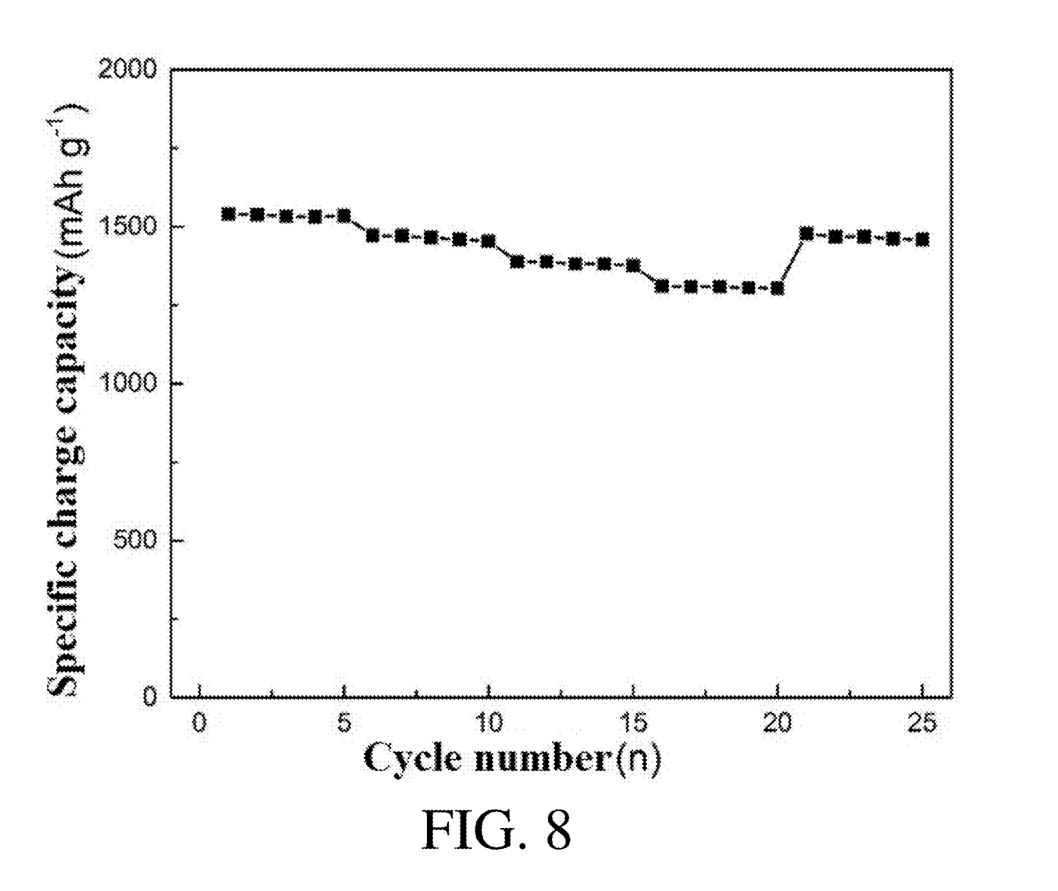
FIG. 8 is a rate capability curve when the silicon-based composite negative electrode material prepared in Embodiment 1 is used as a negative electrode of a lithium ion battery.
Figure 9:
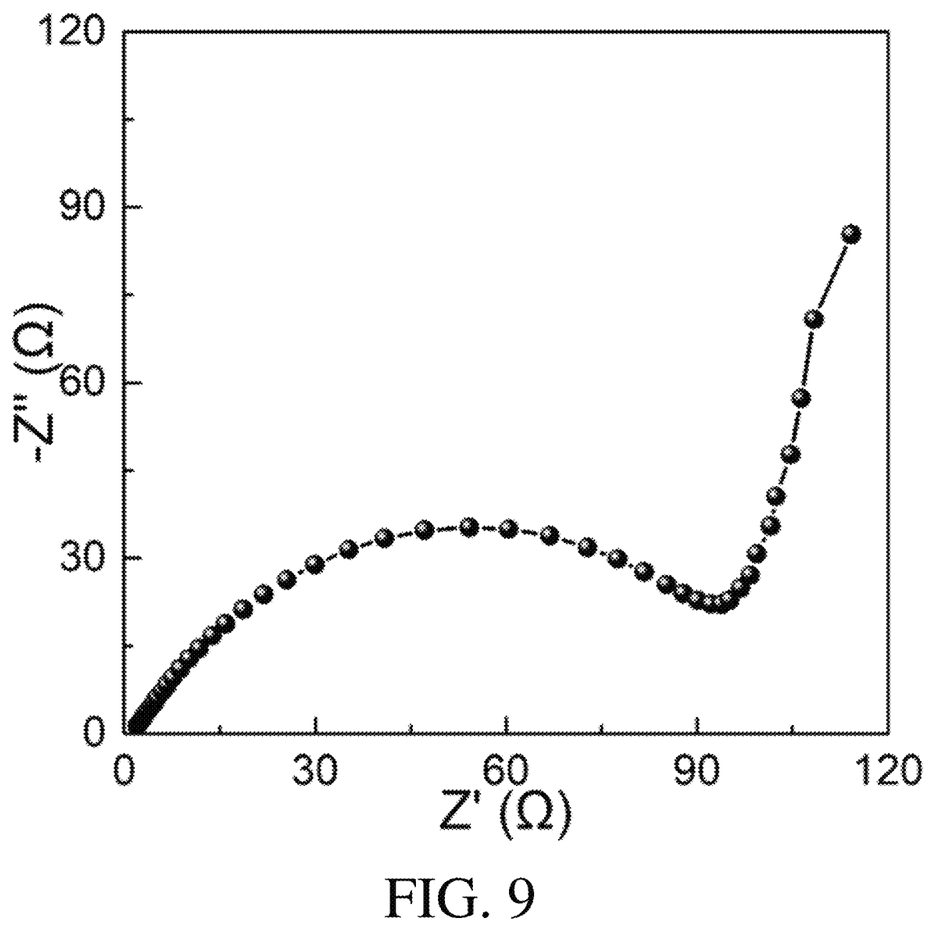
FIG. 9 is an electrochemical impedance curve of the silicon-based composite negative electrode material prepared in Embodiment 1 after 200 cycles as a negative electrode of a lithium ion battery.

An electrochemical analysis test was carried out on the silicon-based composite negative electrode material obtained in Embodiment 1, the charging and discharging interval was 0-2 V, the compaction density was 1.3 g/cm3, the material capacity can reach 1541.3 mAh/g when the silicon-based composite negative electrode material was charged and discharged under the condition that the current density was 380 mA/g (0.2 C), the first cycle coulombic efficiency was 83.8%, the capacity retention rate was 83.3% after 200 cycles (as shown in FIGS. 6 and 7), and it was found in a rate capability test that the silicon-based composite negative electrode material still has the charging specific capacity of 1311.6 mAh/g under a high current density of 5 C (as shown in FIG. 8, five segments from left to right correspond to those under the rates of 0.2 C, 1 C, 2 C, 5 C and 0.2 C), which was 85.1% of the charging specific capacity under 0.2 C, and it was proved that the obtained composite material has high capacity and excellent cycle performance. The electrochemical impedance spectroscopy test of the battery after 200 cycles showed that the charge transfer resistance of the battery was only 98.5Ω (as shown in FIG. 9), which indicated that the material has long cycle life.

According to the same method, the silicon-based composite materials obtained in the embodiments and the comparative examples of the present invention were used as a negative electrode material to be assembled into a button lithium battery, and the electrochemical test result was listed in table 1.

The upper corner mark in the table indicated that the data was obtained by testing under the condition of 0.2 C.

In conclusion, the preparation method provided by the present invention is simple and efficient, the obtained silicon-based composite negative electrode material is stable in structure, has high initial coulombic efficiency, also has good cycle performance, has 200 cycle capacity retention rate of 80% or above, and is excellent in electrochemical performance.

The applicant declares that the detailed process equipment and the process flow of the present invention are explained through the above embodiments, but the present invention is not limited to the detailed process equipment and the process flow, that is, it does not mean that the present invention can be implemented only by depending on the detailed process equipment and the process flow. Those skilled in the art should understand that any improvement of the present invention, equivalent replacement of raw materials of the product of the present invention, addition of auxiliary components, selection of specific modes and the like fall within the protection range and the invention range of the present invention.

What is claimed is:

1. A preparation method of a silicon-based composite negative electrode material for a lithium battery, comprising the following steps:
   (1) drying a raw material A capable of generating $SiO_x$ ($0<x\leq 2$) steam and a raw material B, wherein the raw material B is capable of reacting with a $SiO_x$ vapor to generate a silicate in a non-oxidizing atmosphere;
   (2) vaporizing the dried raw material A and the dried raw material B under vacuum, mixing the vapor of the raw material A and the vapor of the raw material B, and condensing and depositing to obtain a deposited material; and
   (3) crushing the deposited material to obtain particles having a median particle size of 1-20 μm, and apply a carbon coating to the particles to obtain the silicon-based composite negative electrode material;
   wherein the raw material A in the step (1) is one or a combination of two or more of silicon powder, silicon monoxide powder, and silicon dioxide powder; the raw material B is selected from at least one of alkali metal, alkaline earth metal, a third main group elementary substance, oxides thereof, and alloys thereof, with the proviso that the alloys account for 30 wt % or more of the raw material B and comprises magnesium;

TABLE 1

|  | Initial reversible specific capacity (mAh/g)$^a$ | Initial Coulombic efficiency (%)$^a$ | 200-cycle reversible specific capacity (mAh/g)$^a$ | 200-cycle capacity retention rate (%)$^a$ | 5 C rate capacity (mAh/g) | 200-cycle resistor (Ω) |
| --- | --- | --- | --- | --- | --- | --- |
| Embodiment 1 | 1541.3 | 83.8 | 1283.9 | 83.3 | 1311.6 | 98.5 |
| Embodiment 2 | 1479.0 | 82.5 | 1221.7 | 82.6 | 1239.4 | 112.3 |
| Embodiment 3 | 1467.7 | 81.9 | 1177.1 | 80.2 | 1290.4 | 112.3 |
| Embodiment 4 | 1545.7 | 83.9 | 1299.9 | 84.1 | 1326.5 | 99.6 |
| Embodiment 5 | 1446.1 | 81.4 | 1181.5 | 81.7 | 1270.0 | 119.8 |
| Embodiment 6 | 1586.8 | 80.2 | 1277.4 | 80.5 | 1187.5 | 105.4 |
| Embodiment 7 | 1513.2 | 84.1 | 1216.7 | 80.4 | 1279.6 | 103.6 |
| Comparative example 1 | 1364.2 | 77.3 | 1031.3 | 75.6 | 1126.2 | 125.7 |
| Comparative example 2 | 1426.8 | 79.4 | 1115.8 | 78.2 | 1179.0 | 123.1 | wherein the vaporization in the step (2) is realized through a vacuum furnace with a deposition system that comprises two or more heating cavities, wherein the raw material A is placed in a first heating cavity having a heating temperature of 1200-1600° C. and the raw material B is placed in a second heating cavity having a heating temperature of 1000-1200° C., wherein a size of a gas path through which vapor from the two or more heating cavities enters the deposition system is adjustable, and a flow rate of the vapor entering the deposition system is a volume flow ratio of the vapor of the raw material A to the vapor of the raw material B is 100:(1-20).

2. The preparation method according to the claim 1, wherein:

the alkali metal, the alkaline earth metal, the third main group elementary substance are selected from lithium, sodium, magnesium, calcium and aluminum, the oxides thereof are selected from at least one of lithium oxide, sodium oxide, magnesium oxide, calcium oxide, calcium peroxide, potassium oxide, and aluminum oxide, and the alloys are selected from magnesium-lithium alloy, magnesium-sodium alloy, magnesium-calcium alloy, magnesium-aluminum alloy, and magnesium-manganese alloy.

3. The preparation method according to the claim 1, wherein the alloys account for 50 wt % or more of the raw material B.

4. The preparation method according to the claim 1, wherein in the step (2), the vacuum is at a pressure of 1-100 Pa, and the condensing and depositing is carried out at 100-200° C.

5. The preparation method according to claim 1, wherein the volume flow ratio of the vapor of the raw material A to the vapor of the raw material B is 100:(5-15).

6. The preparation method according to the claim 5, wherein a carbon material accounts for 5-10 wt % of the silicon-based composite material, and a coating layer obtained by the carbon coating has a thickness of 1-30 nm.

7. The preparation method according to the claim 5, wherein Hall the coating layer obtained by the carbon coating has a thickness of 5-20 nm.

* * * * *